United States Patent [19]

Hudson

[11] Patent Number: 4,516,024
[45] Date of Patent: May 7, 1985

[54] AUTOMATICALLY ADJUSTABLE APERTURE STOP FOR OPTICAL SCANNING SYSTEM

[75] Inventor: Kenneth C. Hudson, Philadelphia, Pa.

[73] Assignee: RCA Corporation, Princeton, N.J.

[21] Appl. No.: 410,483

[22] Filed: Aug. 23, 1982

[51] Int. Cl.$^3$ .......................... H01J 3/14; G01C 3/08
[52] U.S. Cl. .................................... 250/236; 356/4; 350/6.8
[58] Field of Search ................................ 250/234–236, 250/229; 350/6.5–6.8; 358/206, 202; 354/423, 435, 439, 446, 481; 356/4

[56] References Cited

U.S. PATENT DOCUMENTS

| | | | |
|---|---|---|---|
| 3,074,337 | 1/1963 | Matsuzaki | 354/446 |
| 3,490,835 | 1/1970 | Nemeth et al. | 250/229 |
| 3,637,281 | 1/1972 | Gull | 358/206 |
| 3,741,089 | 6/1973 | Takada et al. | 250/229 |
| 4,009,866 | 3/1977 | Iwata et al. | 354/439 |
| 4,017,145 | 4/1977 | Jerie | 250/236 |
| 4,130,360 | 12/1978 | Courtenay | 356/4 |
| 4,381,889 | 5/1983 | Sahara et al. | 354/446 |
| 4,382,667 | 5/1983 | Kiuchi et al. | 354/446 |

*Primary Examiner*—David C. Nelms
*Assistant Examiner*—J. Brophy
*Attorney, Agent, or Firm*—Joseph S. Tripoli; Robert L. Troike; Christopher Lyle Maginniss

[57] ABSTRACT

In an optical scanning system suitable for use in an aircraft for ground contour measurements, wherein the received image from an illuminated ground spot is reflected from a rotating prism onto paraboloidal mirrors which focus the image at a common focal point, and wherein the rotating prism is also used to transmit the scanning spot-illuminating beam, a wedge-shaped light guide accepts the coincident focused images and funnels them into a photoelectric detector. Because the prism rotates at high speed, variations in light signal transit times due to differences in target distance over the range of the scan cycle and due to differences in aircraft altitude cause the image focal point to shift, necessitating a relatively wide rectangular input aperture on the light guide, resulting in the admittance of large amounts of background light in to the detector. An adjustable shutter is positioned immediately in front of the light guide input aperture to effectively limit the size of the aperture and thereby reduce the background light interference. Shutter baffles which move in response to aircraft altitude are mechanically coupled such that they provide an aperture opening just sufficient to admit the range of image focal points for that altitude.

23 Claims, 5 Drawing Figures

AUTOMATICALLY ADJUSTABLE APERTURE STOP FOR OPTICAL SCANNING SYSTEM

This invention relates generally to an optical scanning system. More particularly, the invention relates to an apparatus for sensing the reflections from a target illuminated by a scanning light beam, which apparatus is especially useful in airborne systems used for mapping ground elevation levels and the detection of camouflaged ground objects.

An airborne optical scanning system used for contour mapping generally includes a laser which emits an RF modulated signal, a system of optical devices for forming a scanning light beam, a sensor for tracking the ground spot illuminated by the scanning beam, and means for measuring the phase of the return signal relative to the transmitted signal to determine the elevation and shape of ground objects. A signal processing unit responds to the phase contour signals to develop a three-dimensional mapping for purposes of detecting camouflaged ground objects.

The beam forming optics of such a system was previously taught by K. C. Hudson in U.S. Pat. No. 4,460,240, issued July 17, 1984, entitled SEMICONDUCTOR LASER SCANNING SYSTEM, and assigned like the present application to RCA Corporation. The present application relates to the illuminated ground spot tracking sensor.

The referenced patent discloses an apparatus suitable for use in an aircraft. The apparatus provides a substantially collimated narrow beam of light which periodically scans across the target surface over a relatively wide angle. The scanning motion is provided by a square prism, or polyhedron, having reflecting plane lateral facets. The prism rotates about a central axis parallel to the reflecting facets. Two substantially collimated light beams are directed onto adjacent facets of the prism and, when reflected therefrom, form a single beam of light which illuminates a ground spot. The single beam of light is then scanned across the direction of flight.

The ground spot sensor requires light collecting apparatus which moves in relation to the scanning spot. For simplicity and for ease of mechanical alignment, it is desirable that the rotating prism used for beam forming and scanning also be used for spot detection. The beam is formed on and transmitted from one portion along the length of the prism's lateral facets while a second portion of the lateral facets receives the light energy reflected from the ground spot and redirects it.

The redirected received light impinges on a light-focusing apparatus, including paraboloidal reflectors, which causes the spot image to be focused at the light aperture of a photoelectric device. This device converts the intensity modulation impressed on the transmitted light beam into a corresponding electrical signal. Because the intensity of light received in a system as heretofore described is extremely small (tens of nanowatts of power), a highly sensitive photoelectric device must be employed. Such a device can be, for example, a silicon avalanche photodiode. However, this device has a very small light-sensitive area and it becomes necessary to guide the image at the focal point of the light-focusing apparatus to this area.

The system thus described would comprise a satisfactory arrangement but for the fact that the transit time of the downwardly-directed light beam and the upwardly-directed reflection is finite and differs throughout the continuum of scan angles. For instance, a light beam directed sixty degrees from the nadir travels twice as far as one directed toward the nadir, and hence requires twice as much time to complete the round trip. This means that the scan prism will have rotated further in the sixty degree instance and will redirect the return image onto the light-focusing apparatus at a different angle than in the nadir-directed instance, and a different incident angle will result in a shifted focal point. In addition, a change in aircraft altitude will shift the set of focal points because of greater or lesser rotation of the prism. In order to accommodate the full range of focal points for the extent of the scan sweep over the range of aircraft altitudes, a funneling device is required, having an input aperture sufficiently large to encompass the locus of focal points. However, a funneling device of this type must necessarily view a large area of background light in addition to the scanning spot, thereby introducing background noise into the photodiode and making ground elevation measurements difficult.

In accordance with one embodiment of the present invention, an apparatus is disclosed for use in an optical scanning system which includes an aperture through which light signals are received. The apparatus limits the area of the aperture exposed to the received light in response to a control signal which is indicative of one boundary of a range of the light signals directed toward the aperture. The apparatus comprises a first movable baffle positioned to occult a first area of the aperture and a second movable baffle positioned to occult a second area of the aperture. The first and second baffles are coupled so as to move in tandem. Finally, means are provided for moving the first baffle in response to the control signal.

Figure 1:
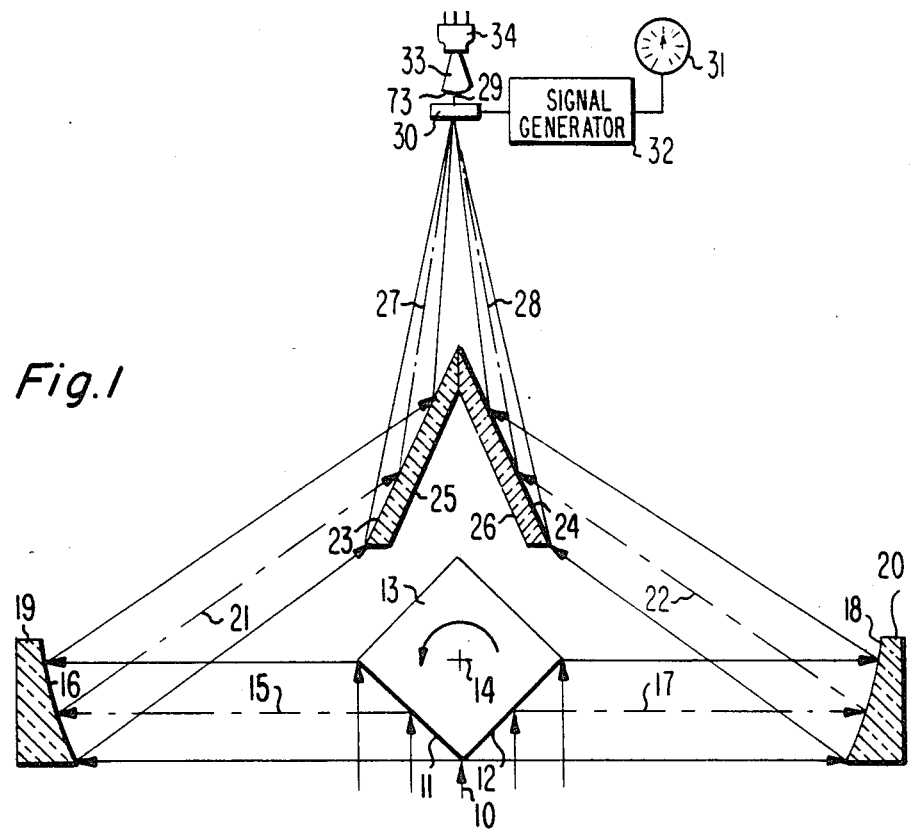
FIG. 1 is an orthogonal view of the preferred embodiment of the present invention.

Referring to FIG. 1, reflected light from an illuminated ground spot, shown as light beam 10, impinges upon adjacent light reflecting surfaces 11 and 12 of prism 13. Although not shown in FIG. 1 and not explained in detail in this disclosure, prism 13 is additionally part of the beam forming apparatus used to produce the illuminated ground spot. (See the referenced patent for a description of prism 13 in its beam forming capacity.) Prism 13 rotates rapidly in a counter-clockwise direction, for example, about central axis 14.

The portion of light beam 10 which strikes surface 11 is reflected as light beam 15 onto left paraboloidal mirror surface 16. The remaining portion of light beam 10, that which strikes surface 12, is reflected as light beam 17 onto right paraboloidal mirror surface 18. Paraboloidal mirrors 19 and 20, which are substantially identical, present concave dish-shaped reflecting surfaces 16 and 18, respectively, to light beams 15 and 17, respectively, which focus the received light images at predetermined focal points. Rotating prism 13 follows the illuminated ground spot which gives rise to light beam 10, and mirrors 19 and 20 are of sufficient size to collect substantially all of the light energy received on the reflecting surfaces of prism 13 during the full scan angle.

Converging beams 21 and 22, reflected from surfaces 16 and 18, respectively, strike reflecting surfaces 23 and 24 of "roof mirrors" 25 and 26, respectively. Reflecting surfaces 23 and 24 deflect converging light beams 21 and 22, forming converging light beams 27 and 28, respectively, which have focal points coincident at common focal point 29. Light beams 27 and 28 pass through adjustable light shutter 30, which will be described in greater detail in conjunction with FIG. 3, located in close proximity to common focal point 29. Altimeter 31 provides an indication of the altitude of the aircraft to signal generator 32 which, in turn, provides an electrical signal to shutter 30 to thereby affect its light-stopping function. In short, the size of the optical aperture through shutter 30 is made to be responsive to changes in aircraft altitude.

Light passing through shutter 30 focuses at point 29 which lies on input aperture 73 of wedge light guide 33. Light guide 33 funnels the light image into photoelectric detector 32 wherein an electrical signal indicative of the intensity of the received light is produced. Wedge guide 33 and detector 34 will be discussed in greater detail in conjunction with FIG. 4.

As was noted earlier, however, not all light beams reflected from prism 13 strike paraboloidal surfaces 16 and 18 at identical angles. Hence, the position of common focal point 29 shifts left and right over the face of input aperture 73 of wedge light guide 33, depending on the round-trip transit time of the light beam which, in turn, is a function of target distance.

In addition to this first angular variation, there is also a shift of the common focal point 29 over input aperture 73 in a direction normal to the plane of the sheet of FIG. 1 due to the lateral displacement along the reflecting facets of prism 13 of the beam-sending from the beam-receiving portions. Where there is a non-negligible offset between transmitting and receiving portions on the prism, light reflected from the target surface arrives at an angle which varies with target distance, and this second angular variation is orthogonal to the aforementioned first angular variation.

Figure 2:
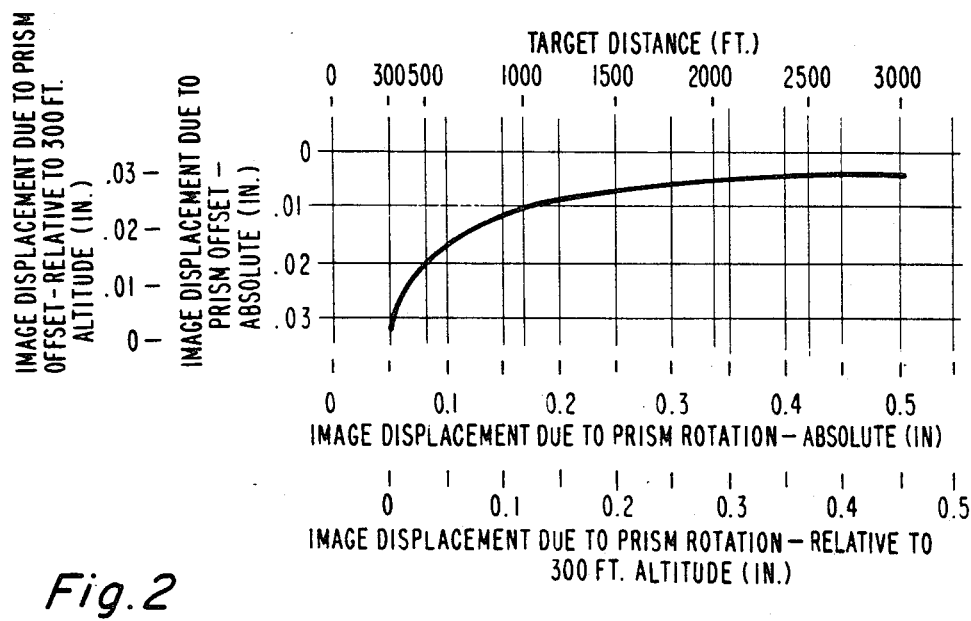
FIG. 2 is a graph of a locus of focal points useful in understanding the present invention.

FIG. 2 is a graph representing the locus of focal points in the system herein described. For purposes of illustration, the following parameters are specified, which parameters will be used throughout the remainder of this specification.

(a) The aircraft altitude range is from 300 to 1500 feet.

(b) The angle of scan is from 60 degrees on one side of the nadir to 60 degrees on the other side of the nadir. Hence, at a given altitude, the ratio of the longest light beam round trip, at a 60 degree angle, to the shortest round trip, directed toward the nadir, is two. Also, from (a) and (b) it is seen that the shortest beam distance is 300 feet (300 feet altitude, beam directed toward nadir) and the longest beam distance is 3000 feet (1500 feet altitude, beam at 60 degrees).

(c) The distance between the transmitting and receiving portions along the lateral facets of the prism is 5 inches (0.42 foot).

(d) The illuminated ground spot is substantially round and occupies and area determined by the 0.5 milliradian transmitted beam.

(e) The prism rotates at 1722 radians per second, thereby providing a scan rate of 1097 scans per second.

(f) The focal lengths of the paraboloidal surfaces is 24 inches resulting in an image size equivalence at their focal points of 0.024 inch/mrad.

Supplied with this information, one can now understand the several scales defining the ordiante and abscissa axes of FIG. 2. The curved trace represents the locus of focal points over the range of target distances from 300 to 3000 feet. Referring first to the "absolute" scales of ordinate and abscissa, at the minimum range of 300 feet, the image (at a focal length of 24 inches) is displaced 0.05 inch due to prism rotation and 0.033 inch due to offset between the receive and the transmit portions of the prism. At the maximum target distance of 3000 feet, the image is displaced 0.50 inch due to prism rotation and 0.003 due to offset. Because 300 feet represents one limit of the system, the displacement scales on ordinate and abscissa may be normalized at that target distance; hence the "relative to 300 ft. altitude" scales.

Considering the two relative scales, it is seen that the image spot moves in a plane which, if bounded by a rectangle, would require an area 0.45 inch long and 0.03 inch wide. However, because the image is not a point, as was traced in FIG. 2, but is an essentially circular spot having diameter 0.5 mrad (0.012 inch), the rectangle must be expanded to include the entire spot at its extreme positions. Additionally, it is good practice to allot a margin around the spot trajectory for ease of alignment; in the present embodiment that margin was selected as 0.5 mrad. Thus, good engineering practice would dictate that an aperture adequate to pass the focused image of a light spot within the parameters defined above would have dimensions of 0.49 inch by 0.066 inch.

Figure 3:
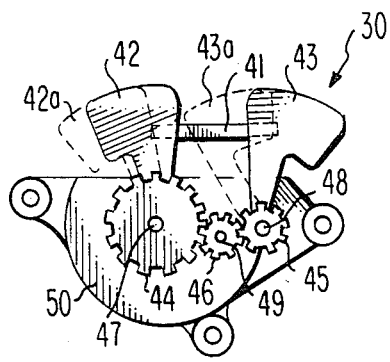
FIG. 3 illustrates the adjustable shutter of the embodiment of FIG. 1.

It may be appreciated that a rectangular aperture 0.49 inch by 0.066 inch is an excessively oversized opening through which to view a spot 0.012 inch in diameter, and that a large amount of background light will enter the aperture making it difficult in the intended application to sort out the desired light signal. FIG. 3 illustrates the adjustable shutter 30 of FIG. 1 in greater detail. Shutter 30 responds to electrical signals indicative of aircraft altitude to stop down the aperture and thereby reduce background light.

Shutter 30 comprises two moving baffles, leading edge baffle 42 and trailing edge baffle 43, which are directly coupled, respectively, to spur gears 44 and 45, each of which intermeshes with idle spur gear 46. Gear 44 is driven by stepping motor and potentiometer 50 which respond to electrical altitude signals from the aircraft altimeter 31 by means of signal generator 32 (as shown in FIG. 1). Gear 44 rotates in a first direction about axis 47, driving idle gear 46 in a second direction about axis 49, which, in turn, drives gear 45 about axis 48. Thus, as baffle 42 moves in one direction toward position 42a, baffle 43 moves in the same direction toward position 43a. The gear ratio between gears 44 and 45 is inversely proportional to the ratio of movement of baffles 42 and 43, respectively. In the embodiment shown, the ratio is 2:1, but this value relates to system defined herein by example, and should not be construed as a limitation on the system.

In a scanning system of the type described herein, at any given altitude, the shortest target distance is equal to the altitude and the largest target distance is the altitude multiplied by the secant of the maximum angle of scan from the nadir. In the present example, that angle is 60 degrees, the secant of 60 degrees is 2, and therefore, at an altitude of 1000 feet, for example, the target distance ranges between 1000 and 2000 feet. Thus, by making reference to FIG. 2, it is seen that at this altitude the aperture may be stopped down to the left of the Target Distance =1000 abscissa and to the right of the Target Distance =2000 abscissa, making due allowance, of course, for image size and margin.

This is precisely the function performed by adjustable shutter 30. Baffles 42 and 43 move in tandem such that when baffle 42 closes down all light directed toward aperture 41 below a corresponding first target distance, baffle 43 closes down all light directed toward aperture 41 corresponding to ranges above a second target distance, where the second target distance is the first target distance multiplied by the secant of the maximum scan angle.

As a result of the background light-stopping feature provided by shutter 30, the following improvements are seen (even after taking into consideration an increase in aperture due to spot image size and margin as specified earlier): at an altitude of 300 feet, 82% of the aperture is closed; at 500 feet, 76% of the aperture is closed; at 1000 feet, 58% of the aperture is closed; and at 1500 feet, 41% of the aperture is closed. Thus the background radiation is reduced by these percentages.

Figure 4:
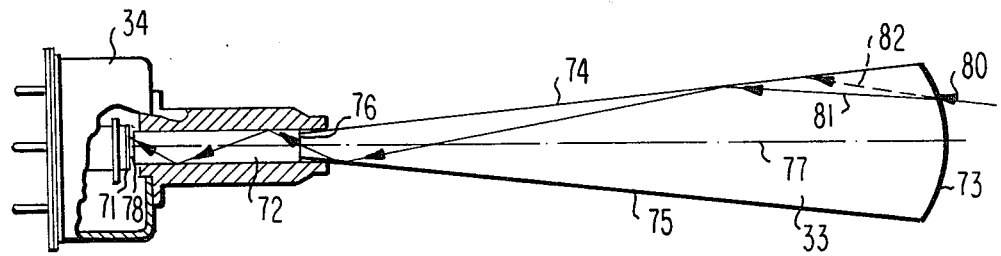
FIG. 4 is an orthogonal view of a wedge light guide and a partially cross-sectioned view of a photoelectric detector of the embodiment of FIG. 1.

FIG. 4 shows wedge light guide 33, in orthogonal view, coupled to photoelectric detector 34, in partial cross-sectional view. Light guide 33, which may be, for example, made of acrylic or polycarbonate sheet material, includes an integral cylinder lens at its input aperture 73. Light incident on the lens at input aperture 73 travels along light guide 33, reflecting internally when it strikes walls 74 and 75, until it reaches output aperture 76. At this point it is coupled into light pipe 72, which may be, for example, a circular optical fiber. Light passing out of light pipe 72 strikes a light sensitive device 71, which may be a silicon avalanche photodiode. Photoelectric detector 34, including photodiode 71, may be similar to type C30906E, sold by RCA Corporation, New York, N.Y., which, for the embodiment herein described, was modified to accommodate light guide 33 and light pipe 72 of appropriate dimensions.

In the preferred embodiment, wedge light guide 33 is made of Lucite acrylic material having a refractive index of 1.50. The dimensions of input aperture 73 are 0.50 inch by 0.066 inch (note relation to discussion of FIG. 2) tapering uniformly to an output aperture 76 having dimensions of 0.085 inch by 0.048 inch, respectively. Light guide 33 is 1.99 inches in length and the lens at input aperture 73 has a radius of curvature of 0.85 inch.

The effect of the integral lens formed at input aperture 73 is to increase the effective acceptance angle of light collection. Light beams, such as beam 80, which strike input aperture 73 at an angle not parallel to central axis 77 are refracted generally toward a parallel with axis 77 and thus strike outer walls 74 and 75 at less severe angles than if input aperture 73 were a plane surface. Compare the angle at which refracted beam 81 strikes wall 74 with the incident angle of (hypothetically) unrefracted beam 82. In a light guide made of a material such as Lucite, light traveling through the guide will be internally reflected so long as its incident angle with the walls does not exceed a predetermined critical angle, which, in the instant embodiment, is 41.8 degrees. It should also be noted that the tapered configuration of light guide 33 produces the result that each successive reflection from an outer wall will be at a more severe angle.

Light passing out of light guide 33 through output aperture 76 enters circular optical fiber 72 which, in the preferred embodiment, has a diameter of 0.098 inch and a numerical aperture (NA) of 0.66, hence, a critical angle of 41.3 degrees (arcsin 0.66). Optical fiber 72 extends to very close to the silicon avalanche photodiode chip 71 within detector 34. By keeping gap 78 small, the light traveling through fiber 72 and coupled into photodiode 71 is maximized.

Figure 5:
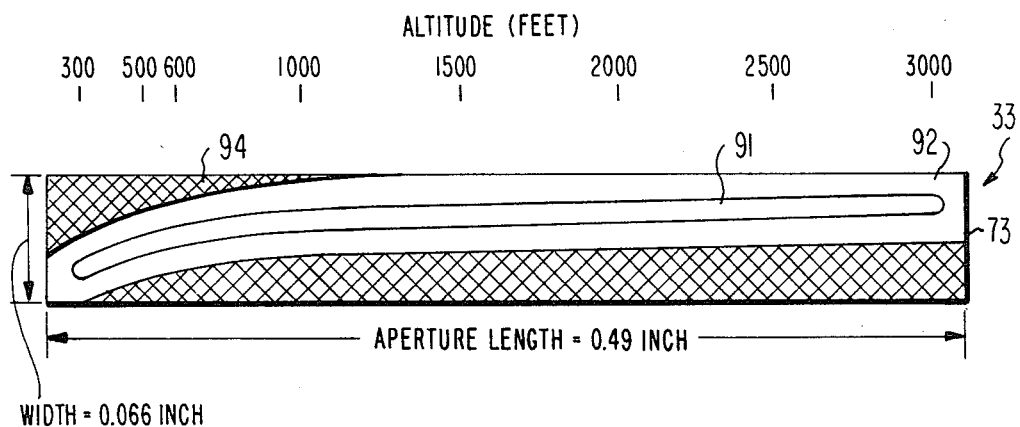
FIG. 5 is a plan view of the input aperture of the wedge light guide of the embodiment of FIG. 1.

An additional approach to background light suppression, which can be used in conjunction with adjustable shutter 30, is shown in FIG. 5 which depicts wedge light guide 33 with input aperture 73 in plan view. As was noted in FIG. 2, the locus of focal points follows a fixed path depending upon target distance. Even when broadening that path to account for image size and margin, a very substantial portion of the input aperture 73 is never illuminated by the scanning spot. Therefore, this never-illuminated area is a source of background light and may be masked off, as shown in FIG. 5, to exclude all but the locus of the image 91 and the area 92 provided for margin. A rough estimate of the area thus masked indicates an aperture size reduction of 45%. The masking process may be accomplished by a deposition of an opaque coating 94 on input aperture 73.

Thus, a scanning beam receiving apparatus is described which focuses the received image and guides it into a photoelectric detector. In spite of the need for an aperture sufficiently large to accept the focused image directed from a range of angles, means are described for automatically adjusting the aperture in response to aircraft altitude to minimize the amount of background light admitted.

What is claimed is:

1. In an optical scanning system having a surface onto which converging light signals are focused, an apparatus for limiting the area of said surface exposed to said light signals, said apparatus comprising:
   a first movable baffle positioned to occult a first area of said surface;
   a second movable baffle positioned to occult a second area of said surface, said first and said second baffles being coupled to move in tandem;
   means for generating a control signal indicative of one boundary of a range of positions from which said converging light signals are directed toward said surface; and
   means for moving said first baffle in response to said control signal.

2. The apparatus according to claim 1 wherein said first and said second movable baffles are rotatably mounted about first and second axes, respectively, so as to move in a plane generally normal to the direction of said light signals.

3. The apparatus according to claim 2 further including first and second spur gears coupled to said first and second movable baffles, respectively, and located concentric with said first and second axes, respectively, said apparatus further including an idle spur gear intermedicate said first and second spur gears and intermeshed therewith, such that said first and second spur gears rotate in the same direction.

4. The apparatus according to claim 3 wherein the ratio of the diameter of said first spur gear to the diameter of said second spur gear is equal to the secant of the angle of maximum scan of said optical scanning system.

5. The apparatus according to claim 2 wherein said moving means includes a stepping motor.

6. The apparatus according to claim 5 mounted in a ground-scanning airborne system, and wherein said control signal is responsive to the altitude of said system.

7. In an optical scanning system in which substantially collimated light beams are applied to adjacent light-reflecting lateral facets of a square prism rotating about its central axis to form a single intensity-modulated light beam which scans across and illuminates a target surface, an apparatus for producing an electrical signal proportional to the intensity of the light reflected from said target surface, said apparatus comprising:
- two light-focusing reflectors each positioned to collect light reflected from said target surface onto a corresponding facet of said prism and reflected therefrom;
- plane reflecting means positioned to redirect the beams reflected by said light-focusing reflectors toward a common focus;
- light funneling means having input and output apertures, said input aperture being positioned at said common focus and being of a size corresponding to the locus of said common foci for light beams incident on said light-focusing reflectors over a predetermined range of angles, said output aperture being smaller than said input aperture;
- adjustable means responsive to the distance between said apparatus and said target surface for baffling light from said input aperture of said light funneling means; and
- a photoelectric device for providing an electrical signal in response to the light intensity at said output aperture of said light funneling means.

8. The apparatus according to claim 7 wherein said lightfocusing reflectors are mirrors, each having a concave reflecting surface which is a section of paraboloid.

9. The apparatus according to claim 8 wherein said mirrors are substantially identical.

10. The apparatus according to claim 7 wherein said light funneling means includes a wedge-shaped light guide having an integral cylinder lens at its input aperture.

11. The apparatus according to claim 10 wherein said light guide having said integral lens is made of Lucite.

12. The apparatus according to claim 10 wherein said light guide tapers uniformly from its input aperture to its output aperture, and wherein the angles of taper are such that light received at said cylinder lens passes through said light guide without exceeding the critical angle of said light guide at any internal reflection.

13. The apparatus according to claim 7 wherein the input aperture of said light funneling means is masked to limit the area of light penetration.

14. The apparatus according to claim 13 including a substantially opaque coating deposited on the surface of said input aperture to provide said mask.

15. The apparatus according to claim 7 further including means for transmitting light from said funneling means output aperture to said photoelectric device.

16. The apparatus according to claim 15 wherein said transmitting means is a circular optical fiber.

17. The apparatus according to claim 15 wherein said transmitting means is physically coupled at a first end to the output aperture of said light funneling means so as to receive substantially all light passing therefrom, and is positioned at a second end sufficiently close to said photoelectric device as to couple substantially all light passing through said transmitting means onto said photoelectric device.

18. The apparatus according to claim 7 where said adjustable means includes:
- a first movable baffle positioned to occult a first area of the input aperture of said light funneling means;
- a second movable baffle positioned to occult a second area of the input aperture of said light funneling means, said first and said second baffles being coupled to move in tandem; and
- means for moving said first baffle.

19. The apparatus according to claim 18 wherein said first and said second movable baffles are rotatably mounted about first and second axes, respectively, so as to move in a plane generally normal to the direction of said light signals.

20. The apparatus according to claim 20 further including first and second spur gears coupled to said first and second movable baffles, respectively, and located concentric with said first and second axes, respectively, said apparatus further including an idle spur gear intermediate said first and second spur gears and intermeshed therewith, such that said first and second spur gears rotate in the same direction.

21. The apparatus according to claim 20 wherein the ratio of the diameter of said first spur gear to the diameter of said second spur gear is equal to the secant of the angle of maximum scan.

22. The apparatus according to claim 19 wherein said moving means includes a stepping motor.

23. The apparatus according to claim 7 wherein said photoelectric device includes a silicon avalanche photodiode.

* * * * *